US012563390B2

(12) United States Patent
Goerbing et al.

(10) Patent No.: US 12,563,390 B2
(45) Date of Patent: Feb. 24, 2026

(54) AUTHENTICATING A DEVICE IN A COMMUNICATION NETWORK OF AN AUTOMATION INSTALLATION

(71) Applicant: Siemens Aktiengesellschaft, Munich (DE)

(72) Inventors: Andrej Goerbing, Berlin (DE); Jonas Hurrelmann, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 563 days.

(21) Appl. No.: 17/684,585

(22) Filed: Mar. 2, 2022

(65) Prior Publication Data

US 2022/0312202 A1 Sep. 29, 2022

(30) Foreign Application Priority Data

Mar. 2, 2021 (EP) .................................... 21160205

(51) Int. Cl.
*H04L 9/00* (2022.01)
*H04L 41/0668* (2022.01)
(Continued)

(52) U.S. Cl.
CPC ......... *H04W 12/06* (2013.01); *H04L 41/0668* (2013.01); *H04W 24/04* (2013.01); *H04W 88/08* (2013.01)

(58) Field of Classification Search
CPC .............................. H04W 12/06; H04W 24/04
(Continued)

(56) References Cited

U.S. PATENT DOCUMENTS

2004/0128393 A1 7/2004 Blakley et al.
2010/0299313 A1 11/2010 Orsini et al.
(Continued)

FOREIGN PATENT DOCUMENTS

CH           716288 A2   12/2020
CN      102801608 A   11/2012
(Continued)

OTHER PUBLICATIONS

Weerathunga, Pubudu Eroshan: "Securing IEDs against cyber threats in critical substation automation and industrial control systems"; 2017 70th Annual Conference for Protective Relay Engineers (CPRE), IEEE, Apr. 3, 2017 (Apr. 3, 2017); pp. 1-20; XP033244011.
(Continued)

*Primary Examiner* — Christopher J Brown
(74) *Attorney, Agent, or Firm* — Laurence A. Greenberg; Werner H. Stemer; Ralph E. Locher

(57) ABSTRACT

A method authenticates a device in a communication network. The method includes transmitting authentication information which indicates the device to an authentication server, which permits or rejects the device as a subscriber in the communication network on the basis of the authentication information. In order that an authentication of a device can also be carried out in a communication network configured with redundancy, the communication network contains two subnetworks. The device is connected to both subnetworks for redundant data transmission. At the start, the device sends authentication requests to access points arranged in the first subnetworks. The access points send the respective received authentication information to an authentication server, which authentication server in each case carries out a check of the authenticity of the device on the basis of the respective received authentication information
(Continued)

and, as the result of the check, permits or rejects the device as a subscriber.

14 Claims, 5 Drawing Sheets

(51) Int. Cl.
  *H04W 12/06*        (2021.01)
  *H04W 24/04*        (2009.01)
  *H04W 88/08*        (2009.01)
(58) Field of Classification Search
  USPC ............................................................. 726/4
  See application file for complete search history.

(56)                    References Cited

U.S. PATENT DOCUMENTS

| | | |
|---|---|---|
| 2012/0239929 A1 | 9/2012 | Newman et al. |
| 2015/0049639 A1 | 2/2015 | Angst et al. |
| 2015/0067819 A1* | 3/2015 | Shribman ............. H04L 67/141 |
| | | 709/218 |
| 2015/0229660 A1 | 8/2015 | Palmin |
| 2018/0097919 A1 | 4/2018 | Mueller et al. |
| 2018/0123632 A1 | 5/2018 | Posselt et al. |
| 2020/0213317 A1* | 7/2020 | Ojha ..................... H04W 24/04 |
| 2020/0267094 A1* | 8/2020 | Maruyama ............ H04W 72/51 |

FOREIGN PATENT DOCUMENTS

| | | |
|---|---|---|
| CN | 103535010 A | 1/2014 |
| CN | 104378291 A | 2/2015 |
| CN | 104850093 A | 8/2015 |
| CN | 107888404 A | 4/2018 |
| EP | 2148473 A1 | 1/2010 |
| KR | 20080053069 A | 6/2008 |
| KR | 101199849 B1 | 11/2012 |

OTHER PUBLICATIONS

"Industrial communication networks—High availability automation networks—Part 1 : General concepts and calculation methods"; IEC 62439-1,Edition 1.2, Feb. 25, 2016; pp. 1-255; XP082001689; ISBN 978-2-8322-3220-0.

Xie Zhixun et al:"Redundancy technique of digital substation communication network", Electric Power Automation Equipment, vol. 31 No. 9,1006-6047 ( 2011 ) 09-0100-04, p. 100-120, Sep. 2011, 20110910—English abstract.

Chen Ke et al:; "Design of concentrator based on electric line broadband carrier and relay routing algorithm"; ( School of Automation Science and Electrical Engineering , Beihang University , Beijing 100191 , China; vol. 31; No. 9; publication date: Sep. 2011—English abstract only, article not available.

* cited by examiner

AUTHENTICATING A DEVICE IN A COMMUNICATION NETWORK OF AN AUTOMATION INSTALLATION

CROSS-REFERENCE TO RELATED APPLICATION

This application claims the priority, under 35 U.S.C. § 119, of European Patent Application EP 21160205.7, filed Mar. 2, 2021; the prior application is herewith incorporated by reference in its entirety.

FIELD AND BACKGROUND OF THE INVENTION

The invention relates to a method for authenticating a device in a communication network of an automation installation, wherein authentication information indicating the device is transmitted to an authentication server, which permits or rejects the device as subscriber in the communication network on the basis of the authentication information.

The invention also relates first to a communication-enabled device for connection to a communication network of an automation installation, and second to a communication network containing such a device.

Communication-enabled devices, i.e. devices which can be connected to a communication network and via the latter exchange data with other devices by transmitting corresponding data messages, are used in many technology fields nowadays, e.g. in the automation of installations. One example of the use of such devices in a communication network is an automation installation, in which network-enabled automation devices (also referred to hereinafter simply as "devices") are connected to one another via the communication network for the purpose of exchanging data messages. Automation installations serve for automating systems, e.g. electrical energy supply networks or electrical switchgear installations, and usually contain automation devices (e.g. so-called field devices) arranged in the vicinity of primary components of the corresponding installation, i.e. of the electrical energy supply network, for example. In the case of an electrical energy supply network, such primary components may be for example electrical cables and lines, transformers, generators, motors or converters. The devices can be for example so-called electrical protection devices or field control devices installed in substations of electrical energy supply networks. In the jargon, such devices are often also referred to as so-called Intelligent Electronic Devices (IEDs). In this case, the devices are connected to the communication network and via the latter exchange data messages containing as payload data, for example, control commands, messages about events (e.g. threshold value contraventions), measured values or status messages.

Automation installations often constitute security-critical systems which need to be protected against unauthorized interventions and manipulations. Therefore, in the communication networks of such automation installations, usually only such devices which have previously undergone a registration are permitted to exchange data with one another, in the course of which registration first their identity is ascertained and second their authorization to exchange data in the communication network is ascertained by a superordinate authority. This process is also referred to as "authentication".

There are various known methods as to how a device can be authenticated in a communication network. In this regard, the standard IEEE 802.1X defines an authentication protocol which makes it possible to ensure that only authorized devices can access a communication network (e.g. a LAN) via enabled communication ports ("access ports") of access points, such as e.g. Ethernet bridges. This port-based authentication according to IEEE 802.1X is often used in communication networks appertaining to information technology (IT). Use also occurs in the context of operation technology (OT), but here the method encounters its limits now and then owing to specific distinctive characteristics, as will be explained in detail later.

FIG. 1 shows an illustration based on IEEE 802.1X-2020, section 7.1, for explaining the authentication of a device 10 for data exchange in a communication network 11. In this case, the device 10 ("host") is connected to an access point 13 of the communication network 11 via a point-to-point connection 12. The device 10 can be for example a personal computer, a communication-enabled terminal or an automation device of an automation installation. The access point 13 can be formed by an Ethernet bridge, for example. After the device 10 has been connected to the access point 13 and switched on, the device in the role of the "supplicant" sends a message 15 containing its authentication information to the access point 13. This can be done by means of the so-called "Extensible Authentication Protocol over LAN" (EAPOL). In this case, the access point 13 assumes the role of the "authenticator" and forwards the authentication information with a further message 16 to an authentication server 14, which can be e.g. a "Remote Authentication Dial-In User Service" (RADIUS) server. The forwarding of the authentication information can be effected for example with a so-called "Extensible Authentication Protocol" (EAP) message embedded in messages of an AAA protocol (authentication, authorization and accounting), for example of the RADIUS protocol.

The authentication server 14 checks the validity of the received authentication information. This can be done for example by checking whether the received authentication information corresponds to reference authentication information, which can be contained for example in a database assigned to the authentication server. An alternative consists in checking whether a certificate linked with the authentication information is trustworthy. Depending on the result of the check, the authentication server responds with a corresponding message 17 to the access point 13, which message causes the access point either to permit the device to have access to the communication network (successful authentication) or to reject the device (failed authentication). After successful authentication, the access point opens its access port and the now authenticated device begins data exchange with other devices in the communication network.

In this way, it can be ensured that only authorized devices may link up with the communication network and the communication network is thus protected against manipulation by third parties and other security attacks, e.g. "eavesdropping", "spoofing" or "denial-of-service".

In addition to safeguarding against attacks, many installations operated in an automated manner also require high fail safety. This requirement has major repercussions on the communication network by which the devices of such an installation are connected to one another. Such communication networks are therefore usually designed with redundancy, that is to say that the reliable transmission of data messages between the individual devices is ensured even in the event of the failure of a communication connection within the communication network. The term "communication connection" is intended hereinafter to encompass the complete transmission link between the respective devices, i.e. to encompass both an available (wired or wireless) transmission medium and the physical, communication-technological and logical linking thereof to the respective device (e.g. interfaces, communication apparatuses, protocol stacks).

One possibility for configuring a communication network with fail safety and, in so doing, ensuring largely seamless continuing operation of the automation installation even in the case of a disturbance of a communication connection is described as the so-called "Parallel Redundancy Protocol" (PRP) in the standard IEC 62439-3. PRP communication networks are widely used in the field of industrial communication and in substations of energy supply networks. One example of a communication network 20 set up in accordance with PRP is shown in FIG. 2. In this case, seamless redundancy is achieved by virtue of the communication network 20 containing two mutually independent subnetworks 21*a* and 21*b* of arbitrary topology and each device 22 being connected to both subnetworks as a so-called "Double Attached Node PRP" (DANP). Devices having only one communication port ("Single Attached Node"-SAN) 23 can be coupled to the communication network 20 via a redundancy unit ("RedBox") 24. Both subnetworks 21*a*, 21*b* operate in parallel operation, wherein a device for sending a data message duplicates the latter and sends it first as a first message 25*a* to the first subnetwork 21*a* and second as a second message 25*b* to the second subnetwork 21*b*. In order to be able to be identified as a redundant PRP message, special suffixes in the form of the so-called "Redundancy Control Trailers" (RCT) are appended to the two messages 25*a*, 25*b*. The device provided as the receiver of the data message receives both data messages (messages 25*a* and 25*b*) from the subnetworks 21*a*, 21*b*, and the device uses the data message that is the first to arrive at said device, and discards the data message that arrives later as a duplicate. In this case, duplicates can be identified by a unique sequence number in the RCT. Since the two data messages use two mutually independent transmission paths in this case, it is ensured, even if a disturbance is present on one of the transmission paths, that the payload information communicated with the data message reaches the receiver via the other—usually still intact—transmission path. The use of a communication network set up in accordance with the PRP standard is known for example from the introductory part of the description of the European patent application EP 2148473 A1.

However, the above-described procedure for authenticating a device is not designed for redundant communication networks.

SUMMARY OF THE INVENTION

The person skilled in the art therefore addresses the problem of also being able to carry out an authentication of a device in a communication network configured with redundancy, in particular a communication network configured according to IEC 62439-3 PRP.

In order to solve this problem, a method of the type described in the introduction is developed according to the invention to the effect that the communication network contains a first subnetwork and a second subnetwork, wherein the device is connected to the first subnetwork via a first communication port and to the second subnetwork via a second communication port for the purpose of redundant data transmission. At the start of the authentication the device sends via the first communication port a first authentication request containing the authentication information to a first access point, which is arranged in the first subnetwork, and sends via the second communication port a second authentication request containing the authentication information to a second access point, which is arranged in the second subnetwork. By way of example, a combination of username and password, an identification of the device, e.g. a Secure Device Identifier (DevID), and/or a device certificate can be used as authentication information. The first and second access points send the respective received authentication information via the respective subnetwork to an authentication server connected to the respective subnetwork, which authentication server in each case carries out a check of the authenticity of the device on the basis of the respective received authentication information and, as the result of the check, permits or rejects the device as subscriber in the respective subnetwork of the communication network.

According to the invention, a separate authentication of the same device thus takes place in each of the subnetworks. The method according to the invention thus has the advantage that, apart from at the device itself, no changes at all need be made to the PRP communication network in order to be able to carry out an authentication. In particular, there is also no need to introduce proprietary changes regarding the PRP standard, which would make interoperability with other devices more difficult.

Specifically, provision can be made for the communication network to be configured for redundant data transmission in accordance with the standard IEC 62439-3 PRP. Thus, in particular, full compatibility with the standards IEEE 802.1X and IEC 62439-3 PRP is afforded in the case of the method according to the invention.

In accordance with a further advantageous embodiment of the method according to the invention, it can be provided that for the purpose of checking the authenticity of the device, the received authentication information is compared with reference authentication information and/or a certificate contained in the authentication information is checked with regard to its trustworthiness, and in the case of correspondence the device is permitted in the respective subnetwork.

In this case, the reference authentication information may have been stored in a database of the authentication server during a system configuration, for example. With regard to the certificate, it is possible for example to check whether the authentication server deems that authority which issued the certificate to be trustworthy.

A further advantageous embodiment of the method according to the invention provides that as a reaction to the check an authentication response is sent to the respective access point of the respective subnetwork, the authentication response indicating whether or not the respective access point may permit the device to effect communication in the respective subnetwork.

In accordance with a further advantageous embodiment of the method according to the invention, it can be provided that a respective authentication server is arranged with each of the subnetworks. In this case, the access by the device to each of the two subnetworks is determined via a separate authentication server. The information for checking the authentication information of the device must then be available to both authentication servers. Alternatively, provision can be made for a single authentication server to be connected to both subnetworks. The messages with the authentication information are fed to this authentication server from both subnetworks. After corresponding checking, the authentication server sends a corresponding message back to the respective access point via each of the subnetworks.

A further advantageous embodiment of the method according to the invention provides that the device contains a first authentication apparatus, which is connected to the first communication port via a first port access control unit, and a second authentication apparatus, which is connected to the second communication port via a second port access control unit, wherein the respective authentication apparatus generates the respective authentication request and transmits it via the respective communication port.

In this way, a separate authentication for each subnetwork can be initiated using simple means.

In this context, it can additionally be provided that the first port access control unit and the second port access control unit are connected to a redundancy unit of the device and during the authentication of the device enable a data exchange of the respective communication port only with the respective authentication apparatus and after successful authentication of the device enable a data exchange of the respective communication port only with the redundancy unit of the device.

Consequently, the respective port access control unit ensures that until the successfully concluded authentication of the device, data communication between the device and other devices in the communication network cannot take place. After successful authentication, by contrast, the corresponding redundant data messages are exchanged with the communication network.

With regard to the redundancy unit, it can additionally be provided that after successful authentication of the device the redundancy unit duplicates messages to be sent by the device and sends them via both communication ports and checks messages received by the device in respect of whether an identical message has already been received, and forwards the received message to an application level of the device or discards it, depending on the check.

Thus, after successful authentication of the device, the redundancy unit carries out the functionality for redundant data exchange.

The problem mentioned above is also solved by means of a communication-enabled device for connection to a communication network of an automation installation, wherein the communication network contains a first subnetwork and a second subnetwork. The device contains a first communication port for connection to the first subnetwork and a second communication port for connection to the second subnetwork for the purpose of redundant data transmission.

According to the invention it is provided that the device contains a first authentication apparatus, which is connected to the first communication port via a first port access control unit and which is designed to generate a first authentication request containing authentication information at the start of an authentication of the device. In addition, the device contains a second authentication apparatus, which is connected to the second communication port via a second port access control unit and which is configured to generate a second authentication request containing the authentication information at the start of an authentication of the device. Moreover, the device is configured to transmit the first authentication request via the first communication port and to transmit the second authentication request via the second communication port.

All explanations given above and below concerning the method according to the invention are applicable with regard to the device according to the invention, and vice versa, mutatis mutandis; in particular, the device according to the invention is configured for carrying out the method according to the invention in any arbitrary embodiment or a combination of arbitrary embodiments. With regard to the advantages of the device according to the invention too, reference is made to the advantages described with respect to the method according to the invention.

One advantageous embodiment of the device according to the invention provides that the first port access control unit and the second port access control unit are connected to a redundancy unit of the device and are configured, during the authentication of the device, to enable a data exchange of the respective communication port only with the respective authentication apparatus and, after successful authentication of the device, to enable a data exchange of the respective communication port only with the redundancy unit of the device.

Moreover, in this context, it can be provided that the redundancy unit is designed, after successful authentication of the device, to duplicate messages to be transmitted by the device and to transmit them via both communication ports and to check messages received by the device in respect of whether an identical message has already been received, and to forward the received message to an application level of the device or to discard it, depending on the check.

Finally, the problem mentioned above is also solved by means of a communication network of an automation installation containing a first subnetwork and a second subnetwork, a first access point in the first subnetwork, a second access point in the second subnetwork, at least one authentication server and at least one device to be authenticated. The communication network is configured to carry out a method as claimed in any of claims for the purpose of authenticating the at least one device. The components of the communication network correspondingly interact for this purpose.

With regard to the communication network, it can additionally be provided that the device is connected to the first access point via its first communication port and to the second access point by way of its second communication port.

Other features which are considered as characteristic for the invention are set forth in the appended claims.

Although the invention is illustrated and described herein as embodied in authenticating a device in a communication network of an automation installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
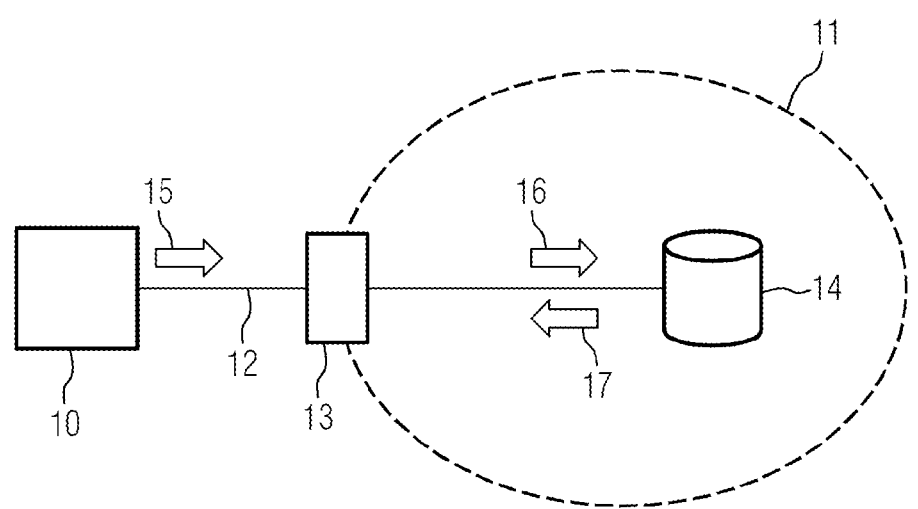
FIG. 1 is an illustration of a device to be authenticated in a communication network in accordance with the prior art.
Figure 2:
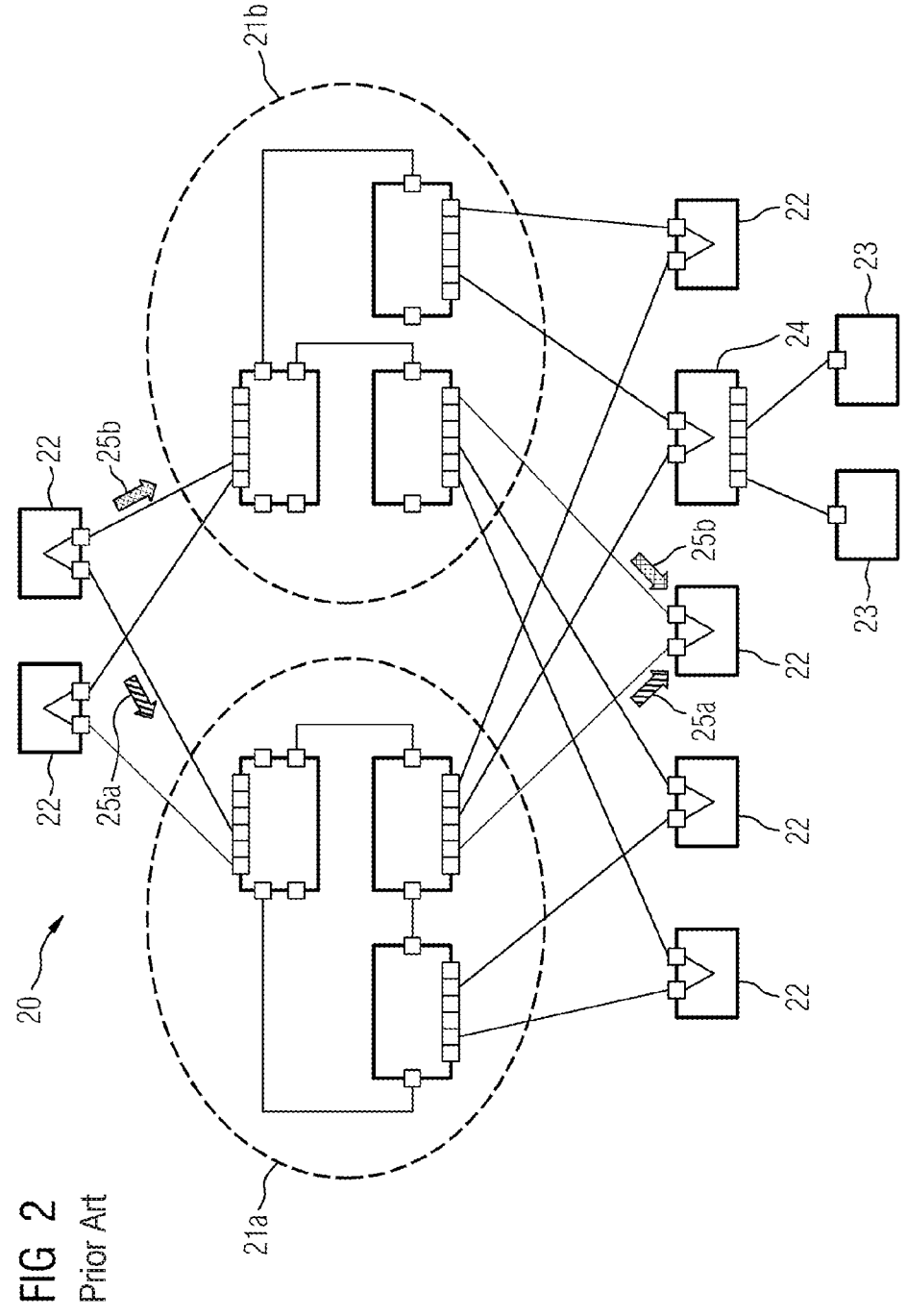
FIG. 2 is a block diagram showing an example of a communication network set up with redundancy in accordance with IEC 62439-3 PRP in accordance with the prior art.
Figure 3:
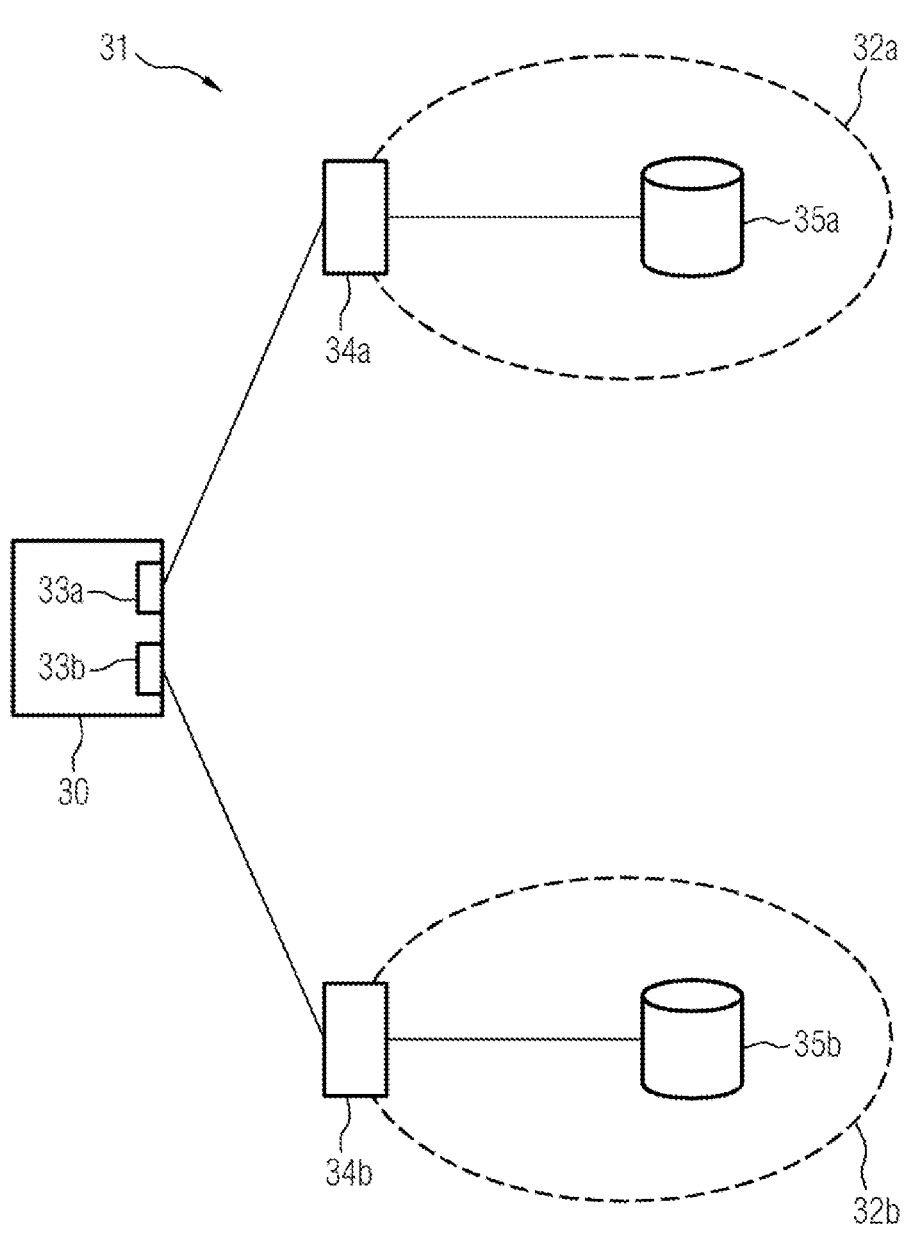
FIG. 3 is a block diagram showing a first exemplary illustration of a device to be authenticated which is connected to a communication network with redundancy.

Referring now to the figures of the drawings in detail and first, particularly to FIG. 3 thereof, there is shown a communication-enabled device 30 that is intended to be permitted as a subscriber in a communication network 31 and carries out an authentication procedure for this purpose. The communication network 31 is configured for redundant data transmission, e.g. according to the standard IEC 62439-3 PRP, and for this purpose contains two subnetworks, namely a first subnetwork 32a (LAN A) and a second subnetwork 32b (LAN B). For the purpose of data transmission, the device 30 is connected to a first access point 34a of the first subnetwork 32a via a first communication port 33a and to a second access point 34b of the second subnetwork 32b via a second communication port 33b. There are point-to-point connections between the device 30 and the respective access point 34a, 34b. The device 30 constitutes a Double Attached Node (DANP) within the meaning of the standard IEC 62439-3 PRP.

The device 30 and the communication network 31 can belong for example to an automation installation of a technical system (e.g., of an energy supply network, of a manufacturing installation or of a process installation). In this case, the device can be for example an automation device for regulating, controlling, monitoring and/or protecting the technical system.

For authentication purposes, the device 30 carries out the authentication process separately for both subnetworks 32a, 32b. Within the meaning of the standard IEEE 802.1X, for this purpose the device 30 takes on the role of the "supplicant", while the respective access point 34a, 34b takes on the role of the "authenticator".

At the start of the authentication, the device 30, via each of its communication ports 33a, 33b, sends a respective authentication request to the respective access point 34a, 34b. The authentication requests include authentication information of the device 30 and can be configured in accordance with the EAPOL protocol, for example. The access points 34a, 34b forward the authentication information to an authentication server connected to the respective subnetwork 32a, 32b. In the embodiment in FIG. 3, two separate authentication servers 35a, 35b are provided for this purpose, one of which in each case is connected to the subnetwork 32a and the subnetwork 32b.

The authentication servers 35a, 35b receive the authentication information from the respective subnetwork 32a, 32b and thereby check whether the device 30 may be permitted as a subscriber to the communication network 31. For this purpose, the authentication servers 35a, 35b have access for example to respective reference authentication information specific to the device 30, with which they compare the received authentication information. Alternatively or additionally, the trustworthiness of a certificate contained in the authentication information can also be checked.

The EAP-based authentication is thus carried out first from the first communication port 33a via the first access point 34a to the first authentication server 35a and second from the second communication port 33b via the second access point 34b to the second authentication server 35b. In this case, the identical authentication information is sent via both subnetworks 32a, 32b to the authentication servers 35a, 35b, which will thereupon make identical decisions about whether the device 30 may be permitted as a subscriber to the communication network 31.

According to the decision, the authentication servers 35a, 35b send authentication responses to the access points 34a, 34b, which in the case of successful authentication open the ports connected to the communication ports 33a, 33b for data exchange.

Since the method for authentication is carried out independently for each communication port 33a, 33b, the authentication requests (EAPOL messages) are not duplicated before they are sent, and accordingly also no duplicates of messages related to the authentication are removed by the device 30 during reception. Consequently, the messages related to the authentication also do not contain a suffix in the form of the redundancy control trailer.

Figure 4:
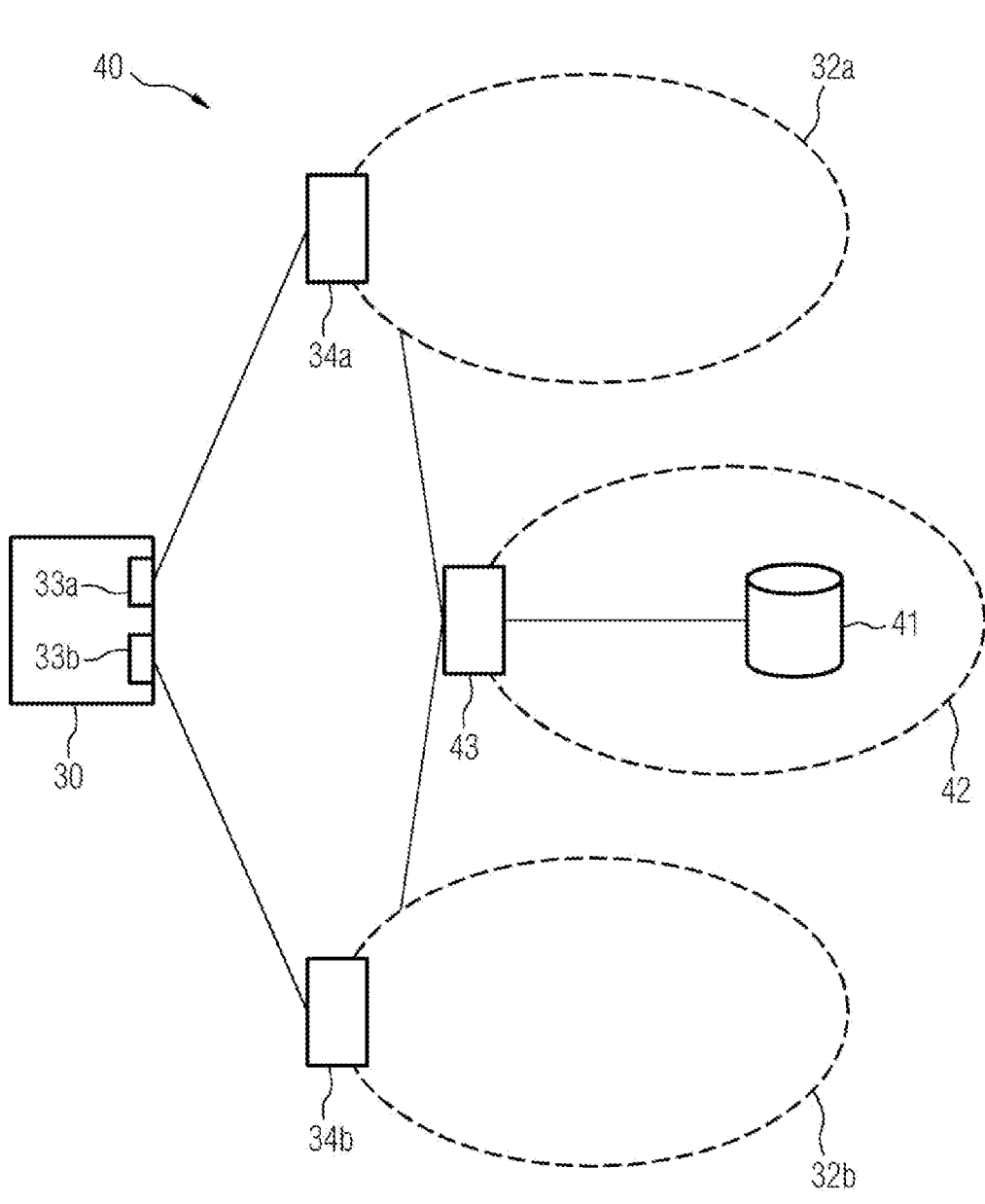
FIG. 4 is a block diagram showing a second exemplary illustration of a device to be authenticated which is connected to a communication network with redundancy.

As an alternative to the set-up in accordance with FIG. 3, the communication network can also be equipped with a single authentication server. This is illustrated in FIG. 4. In this case, identical reference signs designate identical or mutually corresponding components. In accordance with this exemplary embodiment, a communication network 40 is equipped with a single authentication server 41, which is connected both to the first subnetwork 32a and to the second subnetwork 32b. Such an authentication server 41 can for example be arranged in a control center of the automation installation and be connected to a network 42, e.g. a LAN (local area network) or WAN (wide area network). The subnetworks 32a, 32b can be connected to the network 42 via a network access point 43 (Edge Point), e.g. an IP router.

The authentication process proceeds largely as in the example in FIG. 3. In contrast thereto, the messages with the authentication information are communicated from the respective access points 34a, 34b from each subnetwork 32a, 32b via the network access point 43 to the common authentication server 42. The latter thus receives the identification information of the device 30 twice, once from the first subnetwork 32a and once from the second subnetwork 32b. The authentication server 42 checks the authentication information as described above and, in response to each of the messages, sends a corresponding authentication response to each of the subnetworks 32a, 32b. Since the identical authentication information is involved, the authentication response will also contain a correspondingly identical decision and permit or reject the device 30 as a subscriber to the communication network 40.

Figure 5:
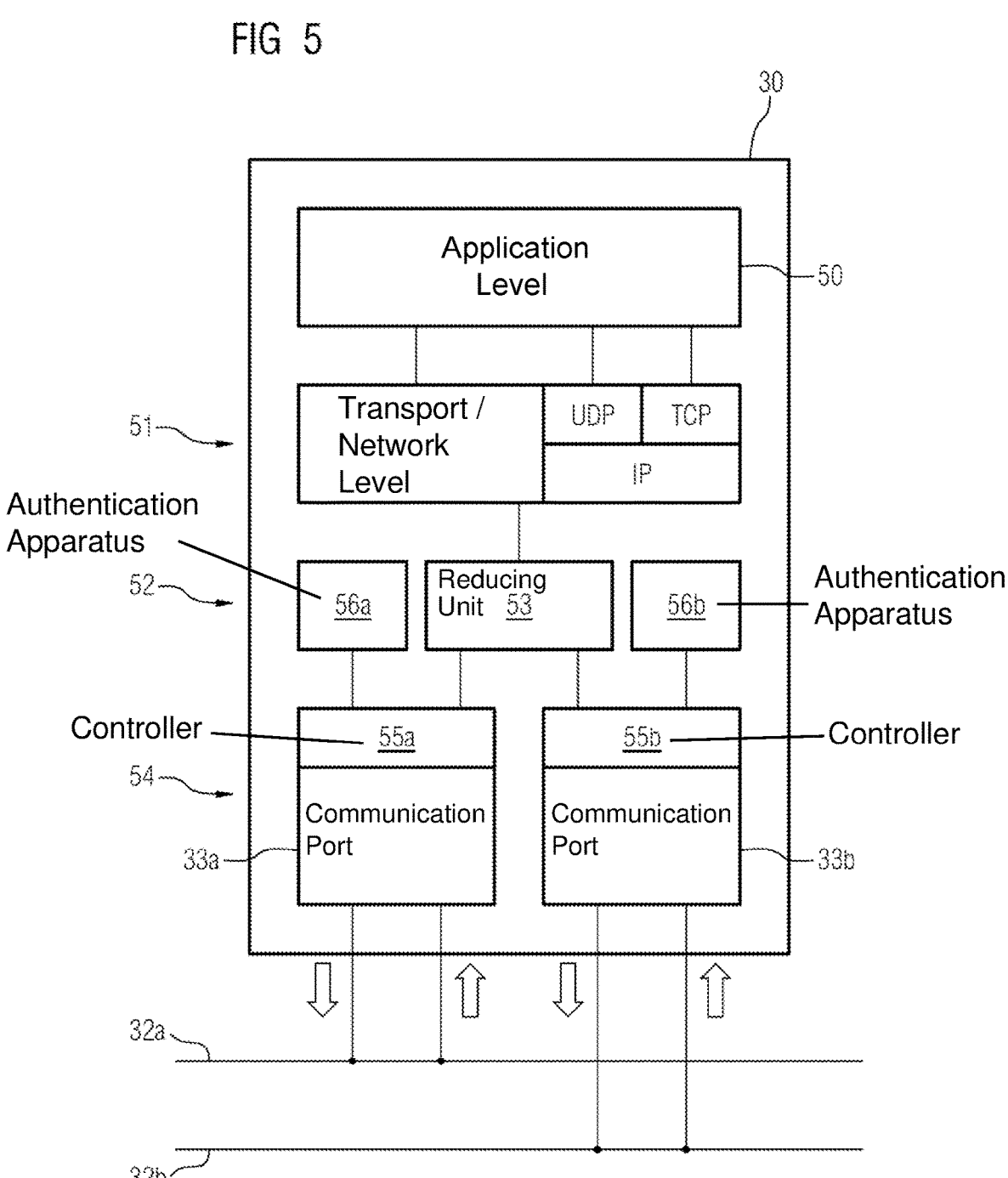
FIG. 5 is a block diagram showing the set-up of a device to be authenticated.

Finally, FIG. 5 shows the schematic set-up of the communication structure of a device 30. The device accordingly has an application level 50, at which the actual device functions are implemented by means of device software running on a processor, for example, an integrated logic component with hardware encoding (ASIC, FPGA) or a combination of device software on a processor and an integrated logic component. For the purpose of external communication, the application level 50 accesses a transport/network level 51 (transport layer, network layer), which has protocol stacks for real-time communication ("hard real-time stack") and also the protocols UDP, TCP and IP.

The transport/network level 51 is connected to a redundancy unit 53 (e.g. a "Link Redundancy Entity" in accordance with IEC 62439-3) of a link level 52 (Link Layer), which is in turn connected to the first communication port 33a and the second communication port 33b of the device 30 at a physical level 54 (Physical Layer). The communication ports 33a and 33b are connected to the subnetworks 32a and 32b, respectively, which are merely indicated in each case in FIG. 5, for the purpose of data exchange.

A first and a second port access control unit 55a and 55b, respectively, are arranged functionally between the communication ports 33a and 33b and the redundancy unit 53. In addition, the respective port access control unit 55a and 55b is in each case connected to an authentication apparatus 56a and 56b, respectively.

The device-side authentication is carried out as described below. The two instances of the port access control unit 55a and 55b, respectively, serve as a protocol-less shim and can optionally be implemented e.g. as "Port Access Controller" PAC or as "MAC Security Entity" (SecY) with additional data encryption within the meaning of IEEE 802.1X-2020.

Each port access control unit 55a, 55b is connected to a communication port 33a, 33b, the redundancy unit "Link Redundancy Entity" (LRE) and a respective instance of the authentication apparatuses 56a, 56b. In this case, the authentication apparatuses 56a, 56b constitute for example authentication protocol machines in accordance with IEEE 802.1X-2020.

For the purpose of initiating the authentication of the device 30, the authentication apparatuses 56a, 56b generate the authentication requests and communicate them via the respective port access controller 55a, 55b to the respective communication port 33a, 33b for transmission to the subnetworks 32a, 32b. Messages (e.g., EAPOL messages) in association with the authentication are thus always exchanged between the respective authentication apparatus 56a, 56b and the respective communication port 33a, 33b.

It is only after the successful authentication of the device 30 that the port access control units 55a, 55b ensure that the data exchange takes place instead between the redundancy unit 53 and the communication ports 33a, 33b. The port access control units 55a, 55b thus serve as status-dependent changeover switches for the communication between firstly the respective communication port and secondly the authentication apparatus 56a, 56b or the redundancy unit 53. In this case, the status of the port access control units 55a, 55b depends on whether or not the device 30 has been authenticated.

As a result, the authentication is carried out without the participation of the redundancy unit 53 independently first by the first authentication apparatus 56a with regard to the first subnetwork 32a and second by the second authentication apparatus 56b with regard to the second subnetwork 32b. The messages associated with the authentication accordingly do not contain a PRP suffix (Redundancy control Trailer—RCT). It is only after the authentication that the redundancy unit 53 is incorporated in the communication, such that redundant messages sent during operation acquire the RCT.

Besides the functional set-up of the device 30 as described in FIG. 5, no changes or extensions become necessary with regard to the individual components of the communication network, and so the solution described is fully compatible with the standards IEEE 802.1X and IEC 62439-3 PRP.

In summary, the invention provides a solution as to how an authentication of a device can be effected in a communication network set up with redundancy. In particular, the authentication is effected in a port-based manner according to the standard IEEE 802.1X in a communication network configured in accordance with the standard IEC 62439-3 PRP. The solution described is particularly advantageously usable in industrial automation installations, for example in the context of the automation of energy supply networks. By this means, fail-safety, on the one hand, and extremely stringent cyber-security requirements, on the other hand, can be effectively combined with one another.

Although the invention has been more specifically illustrated and described in detail above by way of preferred exemplary embodiments, the invention is not restricted by the examples disclosed, and other variations can be derived therefrom by the person skilled in the art, without departing from the scope of protection of the patent claims that follow.

The invention claimed is:

1. A method for authenticating a device in a communication network of an automation installation, the communication network having a first subnetwork and a second subnetwork, which comprises the steps of:

connecting the device to the first subnetwork via a first communication port and to the second subnetwork via a second communication port for redundant data transmission;

sending, at a start of an authentication process of the device, via the first communication port a first authentication request containing authentication information to a first access point, being disposed in the first subnetwork, and sending via the second communication port a second authentication request containing the authentication information to a second access point, being disposed in the second subnetwork;

sending, via the first and second access points, received authentication information via a respective one of the first and second subnetworks to an authentication server connected to the respective subnetwork;

connecting the authentication server to the respective subnetwork and in each case carrying out a check of an authenticity of the device on a basis of the respective received authentication information and, as a result of the check, permitting or rejecting the device as a subscriber in the respective subnetwork of the communication network; and configuring the communication network for redundant data transmission in accordance with standard IEC 62439-3 parallel redundancy protocol with said first subnetwork being constructed functionally identically to said second subnetwork such that identical authentication information is sent via said first subnetwork and said second subnetwork.

2. The method according to claim 1, which further comprises:

comparing the received authentication information with reference authentication information and/or checking a certificate contained in the received authentication information with regard to its trustworthiness for checking the authenticity of the device; and permitting the device in the respective subnetwork in a case of correspondence.

3. The method according to claim 1, which further comprises sending an authentication response to a respective one of the first and second access points of the respective subnetwork as a reaction to the check, the authentication response indicating whether or not the respective access point may permit the device to effect communication in the respective subnetwork.

4. The method according to claim 1, which further comprises disposing a respective authentication server with each of the subnetworks.

5. The method according to claim 1, which further comprises connecting the authentication server to both of the first and second subnetworks as a single authentication server.

6. The method according to claim 1, wherein the device has a first authentication apparatus, which is connected to the first communication port via a first port access control unit of the device, and a second authentication apparatus, which is connected to the second communication port via a second port access control unit of the device, wherein a respective one of the said first and second authentication apparatuses generates a respective authentication request and transmits it via the respective one of the first and second communication ports.

7. The method according to claim 6, wherein the first port access control unit and the second port access control unit are connected to a redundancy unit of the device and during the authentication of the device enable a data exchange of the respective communication port only with the respective authentication apparatus and after successful authentication of the device enable a data exchange of the respective communication port only with the redundancy unit of the device.

8. The method according to claim 7, wherein after a successful authentication of the device the redundancy unit duplicates messages to be sent by the device and sends them via both of the first and second communication ports and checks messages received by the device in respect of whether an identical message has already been received, and forwards a received message to an application level of the device or discards it, depending on a check.

9. A communication-enabled device for connection to a communication network of an automation installation, wherein the communication network having a first subnetwork and a second subnetwork, the communication-enabled device comprising:

a first communication port for connection to the first subnetwork;

a second communication port for connection to the second subnetwork for a purpose of redundant data transmission; and the communication-enabled device configured for carrying out the method according to claim 1.

10. The communication-enabled device according to claim 9, further comprising a first port access controller;

further comprising a second port access controller;

further comprising a first authentication apparatus, which is connected to said first communication port via said first port access controller and which is configured to generate the first authentication request containing the authentication information at a start of the authentication process of the communication-enabled device;

further comprising a second authentication apparatus, which is connected to said second communication port via said second port access controller and which is configured to generate the second authentication request containing the authentication information at the start of the authentication process of the communication-enabled device; and wherein the communication-enabled device is configured to transmit the first authentication request via said first communication port and to transmit the second authentication request via said second communication port.

11. The communication-enabled device according to claim 10, further comprising a redundancy unit; and wherein said first port access controller and said second port access controller are connected to said redundancy unit and are configured, during the authentication process of the communication-enabled device, to enable a data exchange of a respective one of said first and second communication ports only with a respective one of said first and second authentication apparatuses and, after successful authentication of the communication-enabled device, to enable a data exchange of said respective communication port only with said redundancy unit of the communication-enabled device.

12. The communication-enabled device according to claim 11, wherein said redundancy unit is configured, after successful authentication of the communication-enabled device, to duplicate messages to be transmitted by the communication-enabled device and to transmit them via both of said first and second communication ports and to check messages received by the communication-enabled device in respect of whether an identical message has already been received, and to forward a received message to an application level of the communication-enabled device or to discard it, depending on the check.

13. A communication network of an automation installation, the communication network comprising:

a first subnetwork;

a second subnetwork;

a first access point disposed in said first subnetwork;

a second access point disposed in said second subnetwork;

at least one authentication server;

at least one device to be authenticated; and the communication network is configured to carry out the method according to claim 1 for a purpose of authenticating said at least one device.

14. The communication network according to claim 13, wherein:

said at least one device having a first communication port for connection to said first subnetwork and a second communication port for connection to said second subnetwork for a purpose of redundant data transmission; and said at least one device is connected to said first access point via said first communication port and to said second access point by way of said second communication port.

* * * * *